United States Patent
Pinto, IV et al.

(10) Patent No.: US 9,539,986 B2
(45) Date of Patent: *Jan. 10, 2017

(54) ENHANCED VEHICLE WIPER BLADE USING ACTIVE MATERIALS

(71) Applicant: GM GLOBAL TECHNOLOGY OPERATIONS LLC, Detroit, MI (US)

(72) Inventors: Nicholas W. Pinto, IV, Ferndale, MI (US); Scott R. Webb, Macomb Township, MI (US); Alan L. Browne, Grosse Pointe, MI (US); Paul W. Alexander, Ypsilanti, MI (US); Xiujie Gao, Troy, MI (US); Nancy L. Johnson, Northville, MI (US); Wendell G. Summerville, Birmingham, MI (US); John A. Cafeo, Farmington, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/147,282

(22) Filed: May 5, 2016

(65) Prior Publication Data
US 2016/0244027 A1    Aug. 25, 2016

Related U.S. Application Data

(63) Continuation of application No. 13/167,070, filed on Jun. 23, 2011, now Pat. No. 9,358,956.

(51) Int. Cl.
*B60S 1/38* (2006.01)
*B60S 1/40* (2006.01)

(52) U.S. Cl.
CPC ............ *B60S 1/38* (2013.01); *B60S 1/3801* (2013.01); *B60S 1/3848* (2013.01); *B60S 1/40* (2013.01); *B60S 2001/3827* (2013.01); *B60S 2001/3829* (2013.01); *B60S 2001/3836* (2013.01)

(58) Field of Classification Search
CPC ......... B60S 1/38; B60S 1/3801; B60S 1/3848; B60S 2001/3827; B60S 2001/3836; B60S 2001/3829
USPC .......... 15/250.48, 250.361, 250.001, 250.41, 15/250.4, 250.43, 250.44, 250.451
See application file for complete search history.

(56) References Cited

U.S. PATENT DOCUMENTS

| | | | | |
|---|---|---|---|---|
| 5,568,670 A * | 10/1996 | Samples | ................... | B60S 1/38 15/245 |
| 6,401,292 B1 * | 6/2002 | Leutsch | ................... | B60S 1/38 15/245 |
| 2008/0313843 A1 * | 12/2008 | Chou | ...................... | B60S 1/38 15/250.48 |
| 2009/0025175 A1 * | 1/2009 | Boland | ................ | B60S 1/3879 15/250.361 |

FOREIGN PATENT DOCUMENTS

DE        19546508 A1 *    6/1997

* cited by examiner

*Primary Examiner* — Gary Graham
(74) *Attorney, Agent, or Firm* — Quinn Law Group, PLLC

(57) ABSTRACT

A vehicle wiper assembly includes a wiper blade having a length, and an active material disposed along the length of the wiper blade and coupled thereto. The active material includes a shape memory alloy material with a crystallographic phase that is changeable between austenite and martensite, and is elastically deformable and operatively applies a spring force against a portion of the wiper blade when the crystallographic phase is martensite.

12 Claims, 2 Drawing Sheets

ENHANCED VEHICLE WIPER BLADE USING ACTIVE MATERIALS

CROSS REFERENCE TO RELATED APPLICATIONS

This application is a continuation of and claims the benefit of priority from U.S. application Ser. No. 13/167,070, filed Jun. 23, 2011, which is hereby incorporated by reference in its entirety.

TECHNICAL FIELD

The present invention relates to vehicle wiper blade assemblies.

BACKGROUND

A vehicle wiper assembly is a device used to remove liquid, such as rain, and/or debris from the surface of a vehicle window. Often wiper assemblies are used in conjunction with the front windshield/windscreen of the vehicle and/or a rear window of the vehicle. Vehicles that may employ the use of wiper assemblies may include, for example, automobiles, trains, aircrafts and watercrafts.

A wiper assembly generally consists of an arm, pivoting at one end and with a long rubber blade attached to the other. The blade is swung back and forth over the surface of the glass, thus pushing water from its surface. The speed is normally adjustable, with several continuous speeds and often one or more "intermittent" settings. Also, the blade may be adapted to conform to any varying curvature that may be present along the surface of the vehicle's windows.

SUMMARY

A vehicle wiper assembly includes a wiper blade having a length, and an active material disposed along the length of the wiper blade and coupled thereto. The active material may include a shape memory alloy material with a crystallographic phase that is changeable between austenite and martensite, and is superelastic and is operatively configured to apply a spring force against a portion of the wiper blade. In an embodiment, the crystallographic phase of the shape memory alloy may be changeable from austenite to martensite in response to an applied mechanical stress. The superelastic shape memory alloy material may be configured to elastically and reversibly deform up to a strain of about 8-10%.

The vehicle wiper assembly may include a base portion, a wiper portion, and an interconnecting member that couples the base portion to the wiper portion. In an embodiment, the interconnecting member may include the active material. The interconnecting member may be operative to allow the blade portion of the wiper blade to articulate relative to the base portion.

In one configuration, the vehicle wiper assembly may have a spine coupled with the blade, where the spine includes the active material. In an alternate configuration, the vehicle wiper assembly may have a wiper blade frame coupled with the wiper blade, wherein the wiper blade frame has a plurality of blade springs disposed along the length of the wiper blade, and wherein each of the plurality of the blade springs includes the active material.

Finally, the vehicle wiper assembly may include an armature coupled with the wiper blade. The armature may have an armature spring that is made from a shape memory alloy material.

The above features and advantages and other features and advantages of the present invention are readily apparent from the following detailed description of the best modes for carrying out the invention when taken in connection with the accompanying drawings.

DETAILED DESCRIPTION

Figure 1:
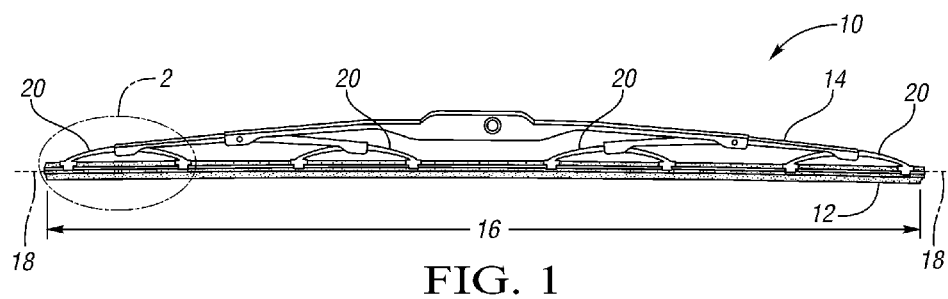
FIG. 1 is a side view of a vehicle wiper assembly.

Referring to the drawings, wherein like reference numerals are used to identify like or identical components in the various views, FIG. 1 schematically illustrates a vehicle wiper assembly 10. In one configuration, the wiper assembly 10 may include a wiper blade 12 and a wiper blade frame 14. The wiper blade 12 may generally have a length 16 that may be substantially measured along a longitudinal axis 18.

In one configuration, the wiper blade frame 14 may include a plurality of blade springs 20 disposed along the length of the wiper blade. Each blade spring 20 may apply a force against the wiper blade 12 to aid it in conforming to the contours of the surface to-be-wiped. As illustrated in the enlarged view provided in FIG. 2, each blade spring 20 may be pivotable with respect to one or more control arms 22 of the wiper frame 14. The blade spring 20 may receive a lateral force from the control arm 22, and may accordingly distribute it to the wiper blade 12. In an embodiment, the blade spring 20 may be made from a rigid material, and may directly pass through the forces applied by the control arm 22 to the wiper blade 12. In another embodiment, the blade spring 20 may be made from a material that has elastic properties that allow the blade spring 20 to elastically yield without breaking or plastically deforming. For example, the blade spring 20 may be made from a shape memory alloy material 24 that may exhibit superelastic properties (i.e., also referred to as pseudoelastic, as will be described below).

The terminology "shape memory alloy" (often abbreviated as "SMA") broadly refers to alloys which exhibit a shape memory effect. That is, the shape memory alloy material 24 may undergo a solid state, crystallographic phase change to shift between a martensite phase, i.e., "martensite", and an austenite phase, i.e., "austenite." Alternatively stated, the shape memory alloy material 24 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable than the comparatively higher-temperature austenite phase.

A shape memory alloy material 24 that exhibits superelastic properties may be an austenitic material at standard operating temperatures, however it may be changeable from austenite to martensite in response to an applied mechanical stress. Superelasticity is also referred to as pseudoelasticity since a large portion of the elastic properties are attributable to the phase transformation rather than typical/conventional elastic deformation. That is, when mechanically loaded, a superelastic shape memory alloy elastically deforms to very high strains—i.e., up to about 8-10%—by the creation of a stress-induced martensitic phase (as compared with more typical elastic strain rates of about 0.5%). As the strain is increased, the proportion of the material that has transformed to martensite progressively rises. This occurs without much increase needed in the applied stress, giving rise to a characteristic "superelastic plateau". When the load is removed, the new phase becomes unstable and the material regains/returns to its original shape. Unlike many shape-memory alloys, no change in temperature is needed for the alloy to recover its initial shape. Typically, superelasticity is exhibited at temperatures slightly above the austenitic start temperature, where the austenitic phase is the more stable than the martensitic phase.

The shape memory alloy material 24 may have any suitable composition. In particular, the shape memory alloy material 24 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof.

The shape memory alloy material 24 can be binary, ternary, or any higher order so long as the shape memory alloy material 24 exhibits a superelastic shape memory effect, i.e., a change in shape orientation, damping capacity, and the like. The specific shape memory alloy material 24 may be selected according to expected operating temperatures that the wiper assembly 10 will be used with. In one specific example, the shape memory alloy material 24 may include nickel and titanium.

Figure 2:
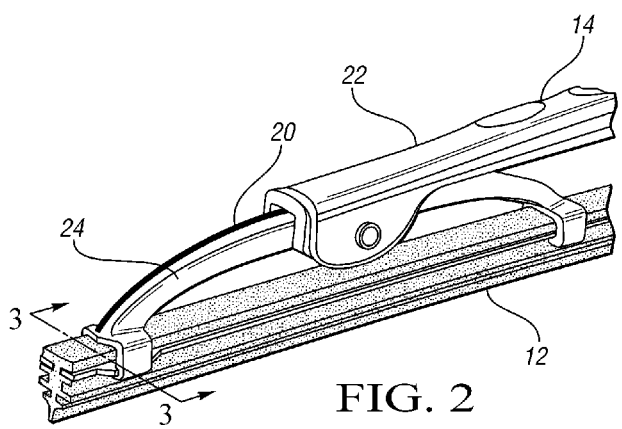
FIG. 2 is an enlarged perspective view of the portion of the vehicle wiper assembly denoted "2," as shown in FIG. 1.

Referring still to FIG. 2, as described above, the blade spring 20 may be made from an active material, such as a superelastic shape memory alloy material 24, which may urge the wiper blade to uniformly contact a curved surface. As such, the blade spring 20 may apply an elastic spring force against the wiper blade 12 throughout a wide range of positions and curvatures, without exhibiting any plastic deformation.

Figure 3A:
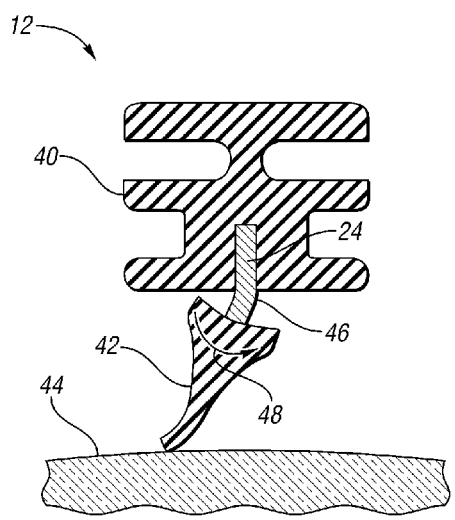
FIG. 3A is a schematic cross-sectional view of an embodiment of a wiper blade, such as taken along section 3-3 in FIG. 2, provided with an elastically articulated blade portion.
Figure 3B:
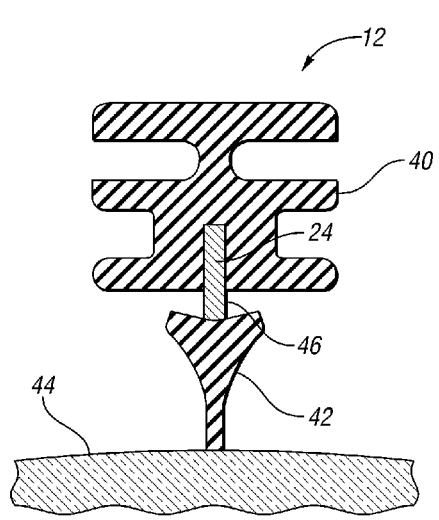
FIG. 3B is the schematic cross-sectional view of the blade provided in FIG. 3A, with the blade portion returned to a reference position that is characterized by substantially no elastic strain in the interconnecting member.

FIGS. 3A and 3B illustrate an exemplary schematic cross section of the wiper blade 12 shown in FIG. 2, and taken along line 3-3. As shown, the wiper blade 12 may include a base portion 40 and a wiper portion 42. The base portion 40 may be suitably designed to couple with the wiper frame 14 (illustrated in FIGS. 1 and 2), while the wiper portion 42 may be suitably designed to wipe liquid along a surface 44 (e.g., a window of a vehicle).

In one configuration, the wiper portion 42 may be coupled to the base portion via an interconnecting member 46. As the wiper blade 12 is laterally traversed over the surface 44, the interconnecting member 46 may elastically deform in a bending manner (as shown in FIG. 3A). During such an elastic deformation, the interconnecting member 46 may apply an elastic torque force 48 against the wiper portion 42 that may urge the wiper portion 42 to remain in contact with the surface 44.

In an embodiment, the interconnecting member 46 may be made from an active material, such as a superelastic shape memory alloy material 24. Upon a removal of the contact stress between the wiper portion 42 and the surface 44, such as by partially lifting the blade 12, the blade may return to its initial reference position (i.e., substantially all elastic strain is recovered). In an embodiment, the superelastic shape memory alloy material may be configured to elastically and reversibly deform up to a strain of about 8-10%. In this manner, the wiper portion 42 may be capable of articulating about the base portion 40 repeatedly, such as in a repetitive side-to-side sweeping motion of the wiper blade 12 across the surface 44.

Figure 4:
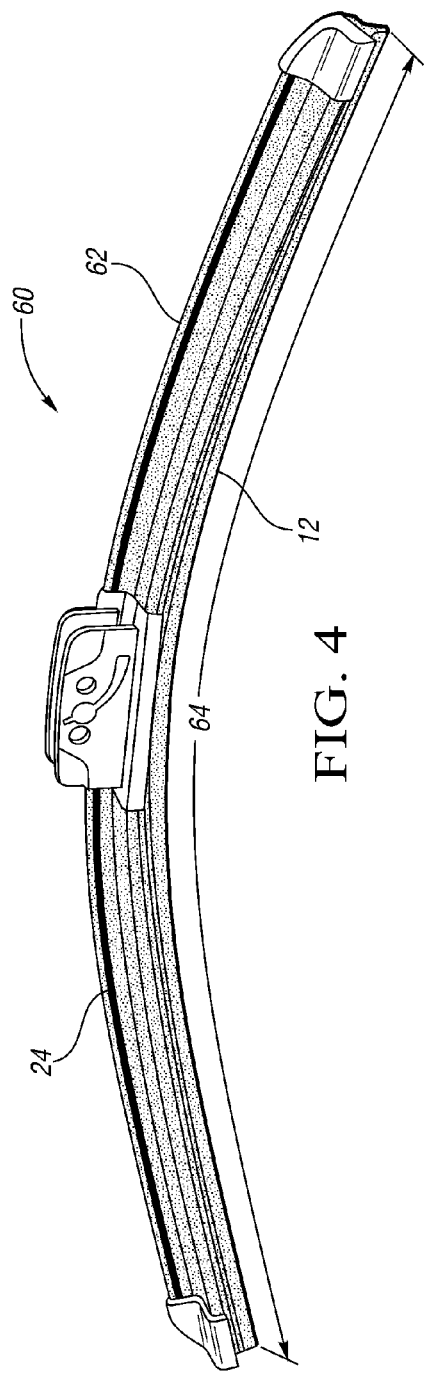
FIG. 4 is a perspective view of a frameless wiper assembly having an active material disposed along the spine.

FIG. 4 illustrates another embodiment of a vehicle wiper assembly 60. As shown, the wiper assembly 60 includes a wiper blade 12, however the assembly 60 substitutes a pressure-applying spine 62 for the wiper blade frame 14 shown in FIGS. 1 and 2. The spine 62 may urge the wiper blade 12 to elastically conform to a surface (e.g., surface 44 provided in FIGS. 3A-3B).

In an embodiment, the spine 62 may include an elastically deformable material that may operatively apply a pressure along a substantial portion of the length 64 of the wiper blade 12. For example, the spine may include an active material, such as a superelastic shape memory alloy material 24 that is disposed along a substantial portion of the length 64. The superelastic shape memory alloy 24 may be in an austenitic crystallographic phase during ambient operating conditions, though may progressively transition to a martensitic state with the application of a mechanical loading. As such, the shape memory alloy 66 may have superelastic properties and may be capable of withstanding a large elastic strain before plastically yielding. Being capable of such high strain ratios may allow the blade to elastically adapt to a wide range of changing surface curvatures, while still maintaining sufficient contact between the blade 12 and the surface 44 along substantially the entire length of the blade 12.

Figure 5:
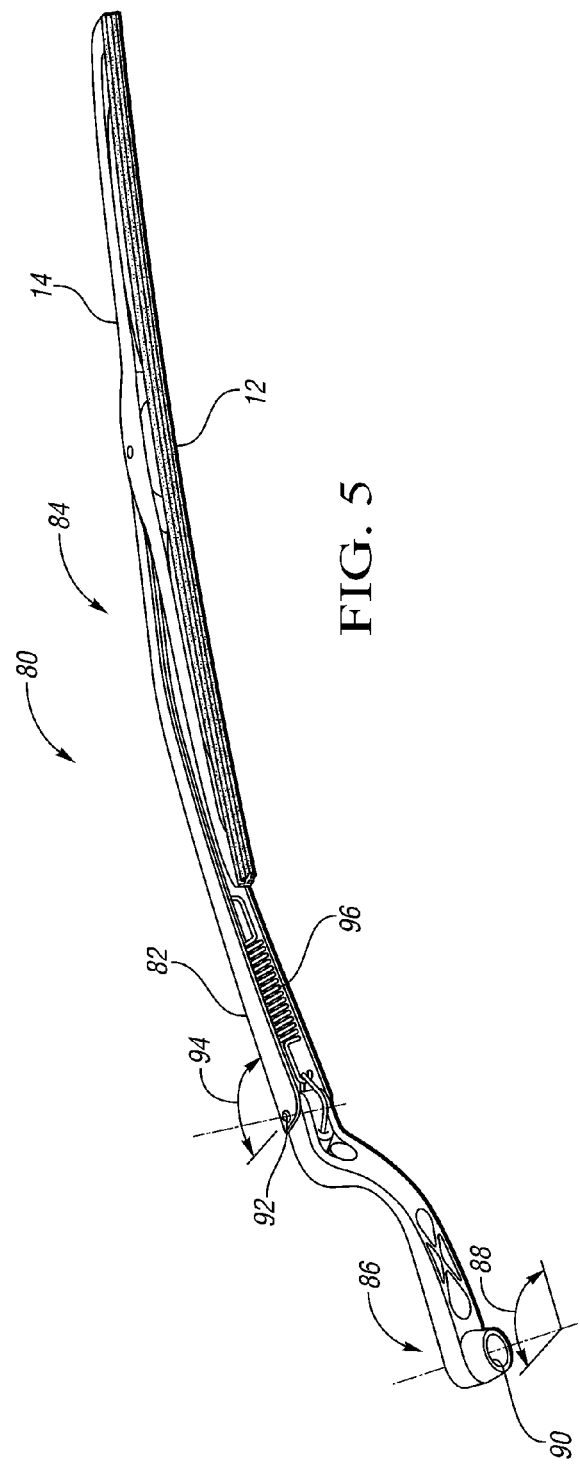
FIG. 5 is a perspective view of a vehicle wiper assembly having an armature coupled with the wiper blade.

FIG. 5 illustrates an embodiment of a wiper assembly 80 that may include a wiper blade 12 and spine 62 (similar to that provided with wiper assembly 60 shown in FIG. 4). Additionally, the wiper assembly 80 illustrated in FIG. 5 may include an armature 82. The armature 82 may be coupled at one end 84 to the spine 62, and may be adapted at the other end 86 to couple with, for example, a rotary actuator (not shown). The rotary actuator may articulate the wiper blade 12 across a surface in a manner that allows it to laterally wipe liquid across a surface in an arc-shaped manner (generally illustrated via arc 88). The armature 82 may, for example, include a bore 90 that may accept and interconnect with the rotary actuator.

The armature 82 may include a hinge 92 along its length that may allow the wiper blade 12 to articulate away from the surface, for example, through a range illustrated by arc 94. By articulating away from the surface, the wiper assembly 80 may allow the wiper blade 12 to be brought to a service position, i.e., a position where the blade 12 may be replaced. Additionally, positioning the blade 12 apart from the surface may be advantageous when the vehicle is parked in cold weather climates to prevent the blade 12 from freezing to the surface. To ensure that the blade 12 remains in contact with the surface when not in the service position, an armature spring 96 may be provided across the hinge 92 to provide a biasing force to the wiper blade 12. The armature spring 96 may be made from a superelastic shape memory alloy material 24 in an austenitic crystallographic phase when at normal operating temperatures.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A vehicle wiper assembly comprising:
   a wiper blade having a length, the wiper blade including:
      a base portion operatively configured to couple with at least one of a spine or a frame;
      a wedge-shaped wiper portion coupled to the base portion via an interconnecting member, wherein each of the base portion, interconnecting member, and wiper portion extend across a longitudinal dimension of the wiper blade from a first end to an opposite second end, and wherein the wiper portion is operative to wipe liquid across a surface;
   wherein the interconnecting member is formed from an active material that includes a shape memory alloy material with a crystallographic phase that is changeable between austenite and martensite;
   wherein the shape memory alloy material is superelastic and is operatively configured to apply a spring force against the wiper portion of the wiper blade; and
   wherein the interconnecting member is operative to allow the wiper portion of the wiper blade to articulate about the longitudinal dimension of the base portion.

2. The vehicle wiper assembly of claim 1, wherein the crystallographic phase of the shape memory alloy is changeable from austenite to martensite in response to an applied mechanical stress.

3. The vehicle wiper assembly of claim 1, wherein the shape memory alloy material is configured to elastically and reversibly deform up to a strain of about 8-10%.

4. The vehicle wiper assembly of claim 1, further comprising the spine, and wherein the spine includes an active material.

5. The vehicle wiper assembly of claim 1, further comprising the frame coupled with the wiper blade, the frame having a plurality of blade springs disposed along the length of the wiper blade; and wherein each of the plurality of the blade springs comprises an active material.

6. The vehicle wiper assembly of claim 1, further comprising an armature coupled with the wiper blade, the armature including an armature spring; and wherein the armature spring includes a shape memory alloy material.

7. A vehicle wiper assembly comprising:
   an armature configured to extend from a rotary actuator;
   a wiper blade having a length and including:
      at least one of a spine or a frame that is operative to be fastened to the armature;
      a base portion coupled to the at least one of the spine or the frame;
      a wiper portion; and
      an interconnecting member that directly couples the base portion to the wiper portion; wherein the base portion, the wiper portion, and the interconnecting member extend across a longitudinal dimension of the wiper blade from a first end to an opposite second end and are supported by the at least one of the spine or the frame;
   wherein the interconnecting member includes a superelastic shape memory alloy material with a crystallographic phase that is changeable between austenite and martensite; and
   wherein the interconnecting member is elastically deformable and is operatively configured to apply a spring force against the wiper portion of the wiper blade.

8. The vehicle wiper assembly of claim 7, wherein the crystallographic phase of the superelastic shape memory alloy is changeable from austenite to martensite in response to an applied mechanical stress.

9. The vehicle wiper assembly of claim 7, wherein the superelastic shape memory alloy material is configured to elastically and reversibly deform up to a strain of about 8-10%.

10. The vehicle wiper assembly of claim 7, wherein the at least one of the spine or the frame is a spine, and wherein the spine includes a superelastic shape memory alloy material.

11. The vehicle wiper assembly of claim 7, wherein at least one of the spine or the frame is a frame having a plurality of blade springs configured to apply a spring force to the wiper blade; and wherein each of the plurality of the blade springs includes a superelastic shape memory alloy material.

12. The vehicle wiper assembly of claim 7, wherein the armature includes an armature spring; and wherein the armature spring includes a shape memory alloy material.

* * * * *